Patented Dec. 16, 1924.

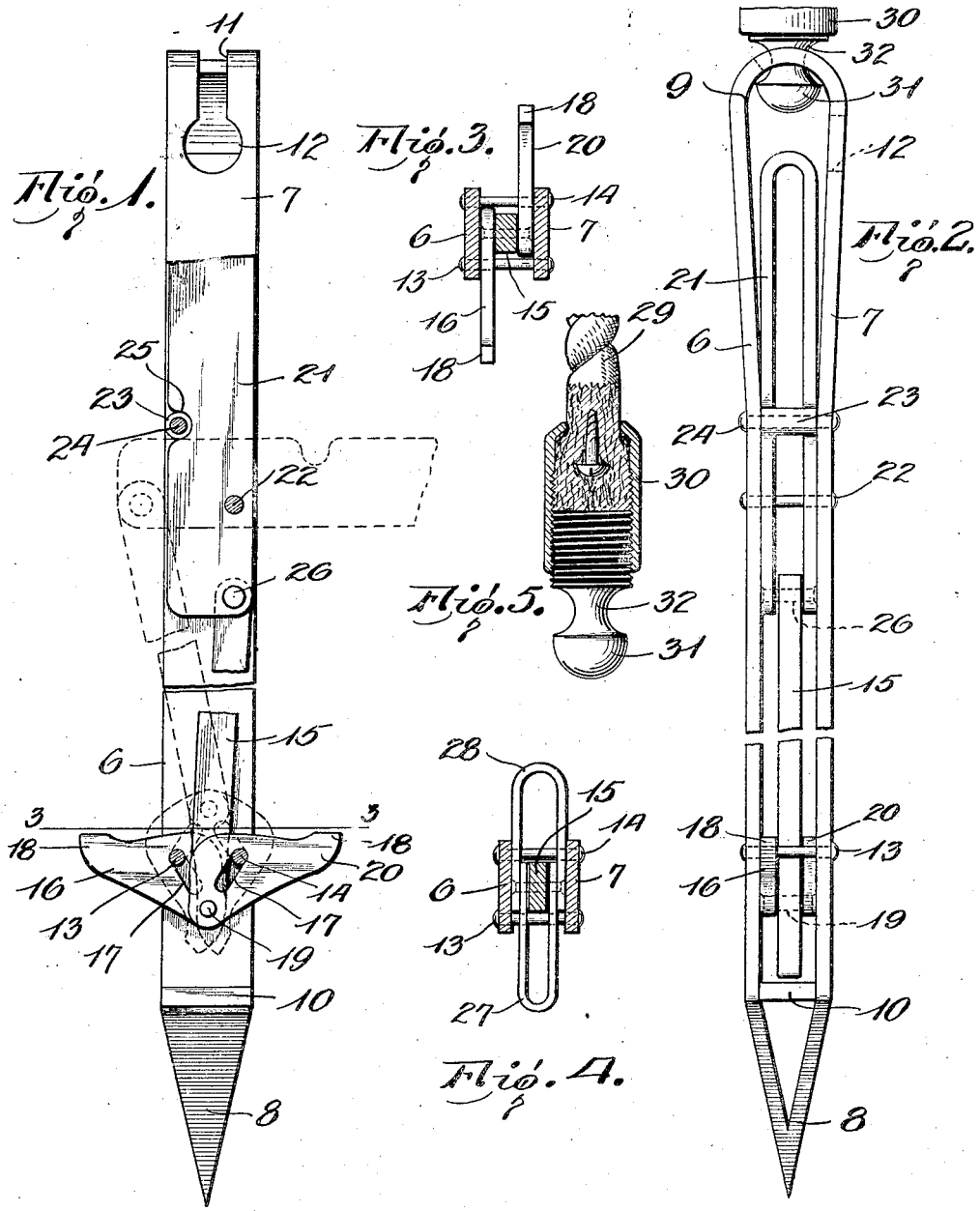

UNITED STATES PATENT OFFICE.

GEORGE B. DUSINBERRE, OF ELMIRA, NEW YORK, AND JOHN W. CALLAHAN, OF WELLSBORO, PENNSYLVANIA, ASSIGNORS, BY MESNE ASSIGNMENTS, TO CALLAHAN DISTRIBUTOR COMPANY, INCORPORATED.

NEEDLE FOR HANDLING HAY OR THE LIKE.

Application filed January 6, 1923. Serial No. 611,115.

*To all whom it may concern:*

Be it known that we, GEORGE B. DUSINBERRE and JOHN W. CALLAHAN, citizens of the United States, the former a resident of Elmira, county of Chemung, and State of New York, and the latter a resident of Wellsboro, county of Tioga, and State of Pennsylvania, have invented certain new and useful Improvements in Needles for Handling Hay or the like, of which the following is a full and complete specification, reference being had therein to the appended drawings.

A system for the handling of hay has been devised by which a power fork or grapple is given a load from a hay wagon or similar receptacle and the loaded fork is then elevated for the purpose of distributing the hay into the mow. One of the essential steps of this process involves the provision of a cable which is threaded through the load as the same is lifted after which one end of the cable is placed at the point of destination for the material while the other end remains at the point at which the forkful of material has been raised. On release of the quantity of material the cable forms a guide conveying the material in the direction of the point of destination and distributing the material as is desired. Such a system forms the subject matter of the applications for Letters Patent filed by John W. Callahan, August 29, 1922, Serial No. 585,065, and January 6, 1923, Serial Number 611,136.

The present invention provides an improved needle or anchor by which the guide rope or cable is attached through the loaded fork and to the main body of material from which the loaded fork is to be raised. It is therefore an important adjunct in the successful threading of the guide cable through the forkful of material.

By way of example we have shown in the drawings one form of embodiment of our invention although numerous changes may be made within the contemplation of the inventive idea. Referring to the drawings, Fig. 1 is a side elevation of the needle;
Fig. 2 is an edge elevation of the same;
Fig. 3 is a horizontal cross section on the line 3, 3 of Fig. 1;
Fig. 4 is a horizontal cross section along the line 3, 3 of Fig. 1, but showing a modified form of barbs, and Fig. 5 shows the attachment by which the end of the cable is connected to the needle.

It is desirable that a device of this character shall offer the minimum of resistance in penetrating the load of hay or other material, shall be capable of offering considerable resistance to the pull of the cable during the step of raising a measured quantity such as a forkful of material, shall be economical of manufacture, rugged to withstand hard usage and lastly, to be convenient and safe for handling by unskilled operators. To accomplish these and similar objects, we preferably make the needle of sheet metal rod or strip of appropriate shape capable of being bent into U-shape at the middle to provide the side members 6 and 7. The ends are brought together and welded or otherwise reduced to form a point 8 as shown in the drawings. The side members 6 and 7 are held apart by means of the upper bend 9 and the strut 10 between which two members there is constructed the barb actuating mechanism. The bent portion 9 is slotted as at 11 and the slot terminates in an enlarged aperture 12 in one side member 7.

Suitably spaced above the strut 10 and connecting side members 6 and 7 are two rivets or pivot pins 13 and 14. The pivot pins are spaced apart to provide a passageway which receives a movable rod 15. Upon pivot pin 13 is maintained a barb 16 made of sheet metal or other material having the configuration as shown. A slot 17 passes diagonally across the face of the barb 16 and slides over the pivot pin 13. The outer extremity of the barb 16 has a tooth 18. The end of the barb opposite the tooth 18 carries a rivet 19.

Mounted upon the corresponding pivot pin 14 and having similar slots 17 thereon, is a complementary barb 20 having an outer tooth 18. The opposite ends of the barb 20 is similarly held by the rivet 19. The barbs 16 and 20 are spaced apart to provide room to receive the bar 15 between them. This bar 15 is also carried upon the rivet 19. In its outermost position with the bar 15 depressed, the barbs 16 and 20 are extended laterally of the needle with the teeth 18, 18 exposed. When the bar 15 is raised into elevated position as shown in dotted lines on Fig. 1, the barbs 16, 20 are rotated so that the teeth 18, 18 are withdrawn into the space between the side walls 6 and 7.

The means for actuating the bar 15 and barbs 16 and 20 consists of the U-shaped handle 21 which is pivoted within the space between the side members 6 and 7 on a pin or rivet 22, out of the longitudinal axis of the needle proper. A stop member consisting of a sleeve 23 carried on a rivet 24 is positioned above the pivot 22 and on the opposite side therefrom. This stop member cooperates with a recess 25 in the side of the handle member. The lower ends of the U-shaped handle are connected by means of a pin 26 which forms a pivot for the upper end of bar 15 which is drilled to receive the pin 26.

Fig. 4 shows a modified form of barb to be used in the above assembly. In this instance the pivots 13 and 14 connecting side members 6 and 7 are as above described and carry the bar 15. The barbs are made of sheet metal bent into U-shape. The inner barb 27 is narrow and fits with its ends directly over the bar 15. The inturned ends of the barb 28 are received between the side members 6 and 7 and the inner ends of the barb 27. The rivet or pin 19 passes through the bar 15 and the ends of the barbs 27 and 28 in which latter member it is fastened. In this manner the barbs may be extended or retracted in the same manner as shown in Fig. 1.

As it is a requisite in devices of this character that the guide cable or rope shall be readily attached to and removed from the handle end of the needle, we have shown in Fig. 5 one form of cable or rope 29 having a sleeve 30 terminating in a rounded stud or head 31 there being a reduced neck 32 between the head 31 and the sleeve 30. The head 31 is of sufficient size to be held against the walls of slot 11 but to be removable through the aperture 12. There should be a reasonably close fit between the neck 32 and the slot 11. A connection of this kind is simple in operation and free from the danger of accidental catching in the machinery or the clothes of the workman. In the operation of the needle above described, the end of the cable is placed in the handle and the handle member 21 turned into right-angled position shown in dotted lines in Fig. 1 to retract the barbs 16 and 20. The needle is then thrust downwardly into the load of material such as hay and through that portion of the load which is engaged by the power fork. The needle is of such length that the barbs 16 and 20 are beneath the mass of material engaged by the fork or grapple. The handle member 21 is then thrown into vertical position thus extending the barbs 16 and 20. The leverage of the barbs is such that the load on one barb is resisted by the load upon the other barb thus maintaining the two in fixed outer position. In the event that the load upon the individual barbs is unequal, the bar 15 will move over to engage the pivot pin 13 or 14 on the side of lesser resistance and thus lock the barbs against displacement. The arrangement of pivot 22 on the opposite side of stop 23 and above the pivot 26 serves to lock handle member 21 against accidental movement.

With the needle set in anchor form as above described a quantity of hay or other material may be lifted by the power fork and the cable 29 threaded through the fork. It is then possible to remove the end 31 of the cable 29 from handle 9 and so position the cable 29 that the same will form a guide for the movement of the hay carried by the fork on its release and thus govern the mode of distribution as outlined more particularly in the applications above referred to.

While we have described one embodiment of our invention it is to be understood that such minor changes in details and arrangement are contemplated as may be found desirable and without departing from the scope of the invention as defined in the following claims.

What we claim is:

1. A needle for piercing loose interlaced material comprising an inverted U-shaped member the lower ends of which are welded together and pointed to provide a piercing end, the bent portion of said member having a slot which extends into one of the side members of the frame and terminates in an enlarged aperture for the reception of a rounded cable head.

2. A needle for piercing loose interlaced material comprising an inverted U-shaped member the lower ends of which are welded together and pointed to provide a piercing end, the bent portion of said member having a slot which extends into one of the side members of the frame and terminates in an enlarged aperture for the reception of a rounded cap head, a barb pivoted between the members adjacent the lower end thereof, a barb operating lever pivoted between said members, connecting means between the barb and lever and a stop adapted to be engaged by said lever for pressing the needle into the material.

3. A needle for piercing loose interlaced material comprising an inverted U-shaped member the lower ends of which are welded together and pointed to provide a piercing end, the bent portion of said member having a slot which extends into one of the side members of the frame and terminates in an enlarged aperture for the reception of a rounded cap head, spaced pivot members near the lower end of said member, slotted barbs carried on each of said members, a link extending longitudinally of the needle between said pivot members, a bolt connecting the barbs with the link and means for reciprocating the link and operating the barbs comprising a lever member located near the upper end of said members and engaging a stop member when swung at right angles to the said member for pressing the needle into the material.

In testimony whereof, we have hereunto affixed our signatures.

GEORGE B. DUSINBERRE.
JOHN W. CALLAHAN.